United States Patent
Meyer

(10) Patent No.: US 6,334,524 B1
(45) Date of Patent: Jan. 1, 2002

(54) DEVICE FOR HANDLING FACE CUTTING PRODUCTS

(75) Inventor: Gerhard Meyer, Bundesrepublik Deutschland (DE)

(73) Assignee: Polar-Bandpack Bundelmaschinen GmbH, Neusass (DE)

( * ) Notice: Subject to any disclaimer, the term of this patent is extended or adjusted under 35 U.S.C. 154(b) by 0 days.

(21) Appl. No.: 09/571,404

(22) Filed: May 15, 2000

(30) Foreign Application Priority Data

Jun. 8, 1999 (DE) .......................... 199 26 073

(51) Int. Cl.$^7$ ................................. B65G 1/00
(52) U.S. Cl. ....................... 198/347.1; 83/109
(58) Field of Search .................. 198/347.1, 347.2, 198/348; 83/72, 374, 438, 445, 81, 78, 112, 155, 109

(56) References Cited

U.S. PATENT DOCUMENTS 5,960,927 A * 10/1999 Bahr .................. 198/347.1

* cited by examiner

Primary Examiner—Kenneth W. Noland

(74) Attorney, Agent, or Firm—Jones, Tullar & Cooper, P.C.

(57) ABSTRACT

In a device for handling face cutting products, in particular a buffer, arranged between a face cutting device (1) and a further processing device (4), with a table (6) that receives layers (7) comprised of sequential rows (2), a forward feed device (10, 11) that incrementally advances the layer (7), a take-off device (17) that takes the respective foremost row (2) of the layer (7) from the forward feed device and places it against a transverse stop (12) running transverse to the take-off device, and an evacuating device (13) allocated to the transverse stop (12) for removing the row (2) placed against the transverse stop, a high operational reliability and gentle mode of operation can be achieved by virtue of the fact that a gap is provided between the table (6) and transverse stop (12), which accommodates the take-off device (17), which exhibits a plate arrangement moveable in and against the take-off direction, comprised of a front take-off plate (18) proceeding coplanar to the table (6) and a follower plate (19) hinged to the latter so that it can freely move vertically to the surface plane of the table, wherein the take-off plate (18) travels under the transverse stop (12), and snugly abuts a table projection (31) in the back end position, and wherein the follower plate (19) on which the table projection (31) lies and which is routed under the table projection (31) in its back end position, can be lifted at least with its front edge from its level lying below table level to a level flush with the take-off plate (18) and vice versa during the forward feed motion.

15 Claims, 3 Drawing Sheets

DEVICE FOR HANDLING FACE CUTTING PRODUCTS

Figure 1:
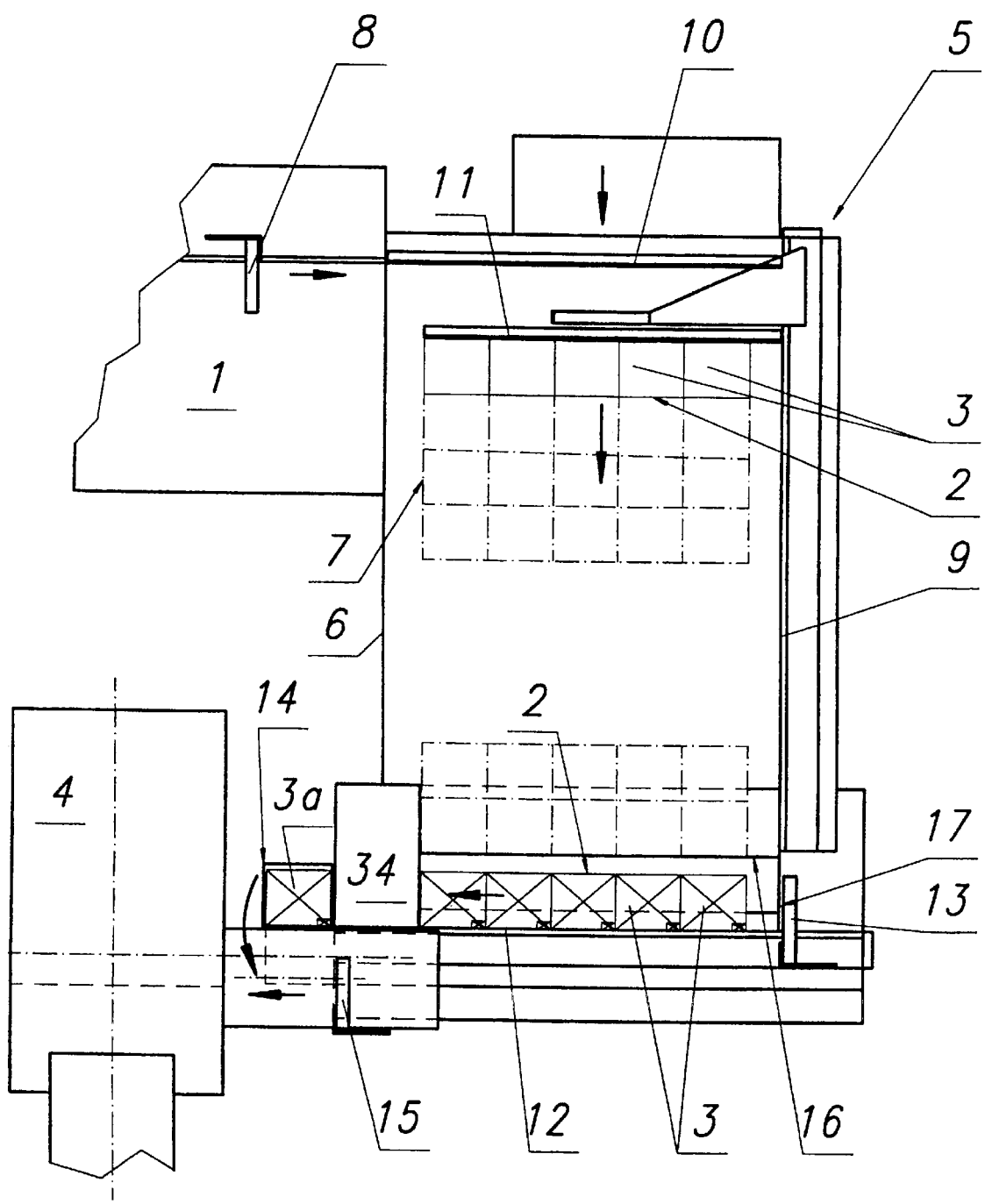

The invention relates to a device for handling face cutting products, in particular a buffer, arranged between a face cutting device and a further processing device, with a table that receives layers comprised of sequential rows, a forward feed device that incrementally advances the layer, a take-off device that takes the respective foremost row of the layer from the forward feed device and places it against a transverse stop running transverse to the take-off device, and an evacuating device allocated to the transverse stop for removing the row placed against the transverse stop.

In the known arrangements of this kind, the take-off device rollers or cylinders in allocated slits of the table extending up to the stop running transverse to the take-off device, which are provided with peripheral spikes that project over the surface of the table, and can be made to engage the lower side of the respective row to be taken off. When processing sensitive paper, the danger is that the lowermost sheets that engage the spikes might become damaged. At a comparatively large useful width, i.e., higher row width and hence high weight, the danger is that the spikes will slip through, so that there is no reliable separation of the foremost row from the layer, and no reliable abutting against the transverse stop. At a comparatively small useful width, there is a danger of collapse. Another disadvantage to the known device is that the packages must usually pass over the slits in the table when pushed out to the side in a row of several packages lying one next to the other. This gives rise to the danger that the lowermost sheets might get caught in the slits. Therefore, the above disadvantages can result in considerable operational disruptions and damages. Hence, the known arrangements of the kind mentioned at the outset proved to be insufficiently reliable and gentle.

Proceeding from the above, the object of this invention is to improve an arrangement of the kind mentioned at the outset with simple and inexpensive means in such a way as to ensure the smoothest possible operation and gentlest possible treatment of the products.

According to the invention, this object is achieved by providing a gap between the table and transverse stop, which accommodates the take-off device, which exhibits a plate arrangement moveable in and against the take-off direction, comprised of a front take-off plate proceeding coplanar to the table and a follower plate hinged to the latter so that it can freely move vertically to the surface plane of the table, wherein the take-off plate travels under the stop, and snugly abuts a table projection in the back end position, and wherein the follower plate on which the table projection lies and which is routed under the table projection in its back end position, can be lifted at least with its front edge from its level lying below table level to a level flush with the take-off plate and vice versa during the forward feed motion.

The disadvantages of the known arrangements mentioned at the outset can be completely avoided by taking these measures. The fact that the take-off plate and the follower plate fit flush against each other in the front position advantageously yields a flat supporting surface for the row placed against the stop, which enables a smooth transverse ejection, even when processing comparably heavy material, such as wavy material furnished with an aluminum coating, etc. Since the take-off plate lies flush against the table projection in the back end position, a flat, smooth supporting surface results there as well, so that the foremost row of the layer can be smoothly pushed onto the take-off plate. Another very special advantage to the measures according to the invention is that the plate arrangement can always execute the same lift, regardless of the respective format being processed at the time, i.e., independently of the row width viewed in the take-off direction, so that no format-dependent adjustability is required, thereby simplifying construction and operation.

Advantageous configurations and expedient further developments of the primary measures are presented in the subclaims, and may be gleaned from the description of an example below based on a drawing.

Figure 2:
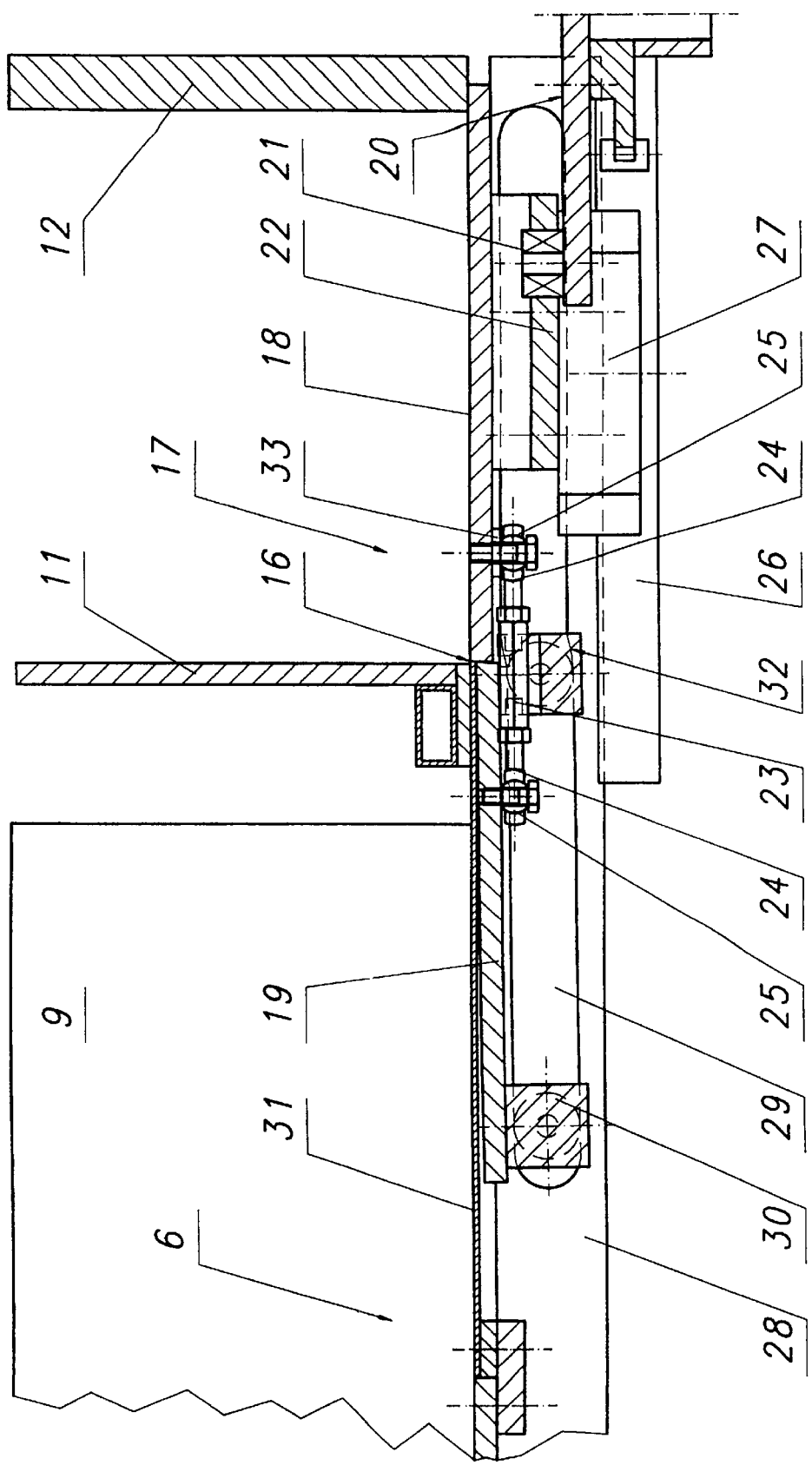
Figure 4:
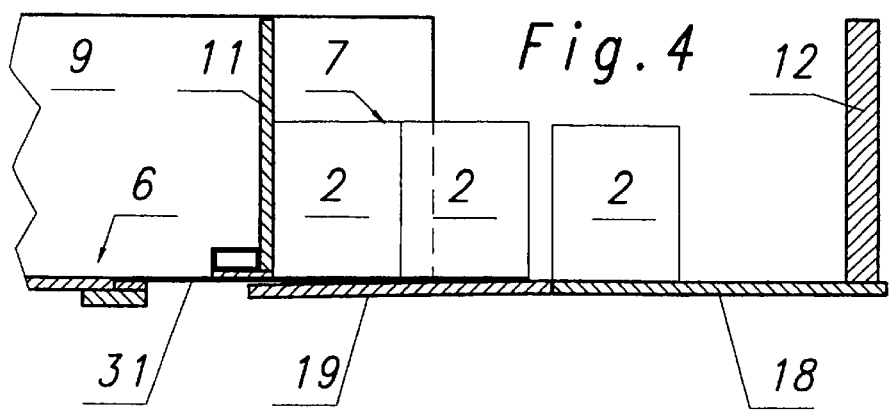
Figure 5:
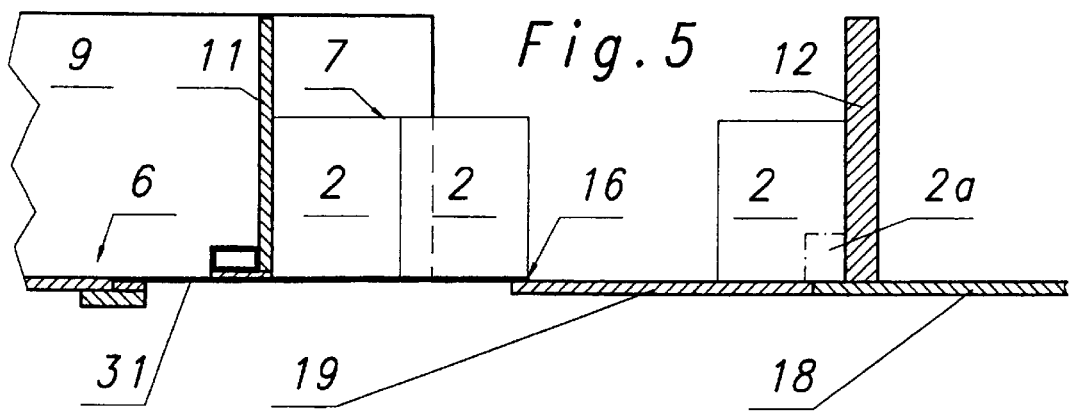
Figure 6:
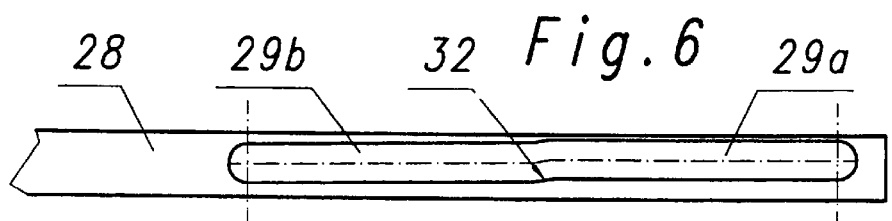

The drawing described below shows:

FIG. 1 a schematic top view of a buffer according to the invention of an arrangement for making labels, FIG. 2 a longitudinal section through the take-off device of the arrangement according to FIG. 1, FIGS. 3–5 several positions of the take-off device in FIG. 2, schematic view, and FIG. 6 a side view of a crank allocated to one of the follower plates of the take-off device.

During the manufacture of labels, packets of printed sheets are longitudinally and transversely cut in a manner known in the art using a face cutting machine 1 own only schematically on FIG. 1, resulting in rows 2 with useful packages 3 lying one next to the other, which are fed sequentially to a stamp 4, also shown only schematically, for stamping out the labels. Provided between the face cutting machine 1 and the stamp 4 is a buffer 5 with a receiving table 6, which can receive a so-called layer 7 comprised of sequential rows 2.

Allocated to the face-cutting machine is an ejection device 8, through which one row 2 at a time can be ejected onto the receiving table 6, as indicated by an arrow on FIG. 1. The receiving table 6 is provided with a lateral stop 9 running transverse to the ejection direction, which hear laterally bounds the usable surface of the receiving table 6. The respective row ejected from the face-cutting machine 1 is placed against the back end of the layer 7 received by the receiving table 6 by means of a timed feed rack carrier 10 that operates in unison with the ejection device 8. This layer is incrementally advanced by means of an additional layer feed rack carrier 11. The forward feed devices of the timed feed rack carrier 10 and layer feed rack carrier 11 are also indicated on FIG. 1 by arrows. The layer feed rack carrier 11 is folded back with the feed rack carrier 10 in operation. The rows 2 ejected through the ejection device 8, and hence the layer 7 formed from them, are aligned flush with the back edge of the layer feed rack carrier 11 in the example shown. However, they could conceivably also abut the lateral stop 9.

Provided at the front end of the buffer 5 is a transverse stop 12 running transverse to the forward feed device, against which a row 2 taken off of the layer 7 can be placed. Allocated to the transverse stop 12 is a row feed rack carrier 13 moveable parallel thereto, through which the respectively placed row 2 can be laterally ejected in packages, as also indicated by an arrow. The ejected packages 3a are relayed to the stamp 4. To this end, a rocker 14 is provided in the example shown, which grips the respectively ejected package 3a and moves it to the working area of an overhead feed rack carrier 15, which feeds it to the stamp 4, as also indicated by the arrows.

The transverse stop 12 is spaced apart from the front edge 16 of the receiving table 6. Allocated to the resulting gap is a take-off device 17, which takes the foremost row 2 of the layer 7 brought into its working area off of the layer and places it against the transverse stop 12. The structure and function of the take-off device 17 will be described in greater detail below based on FIGS. 2 to 6.

Figure 3:
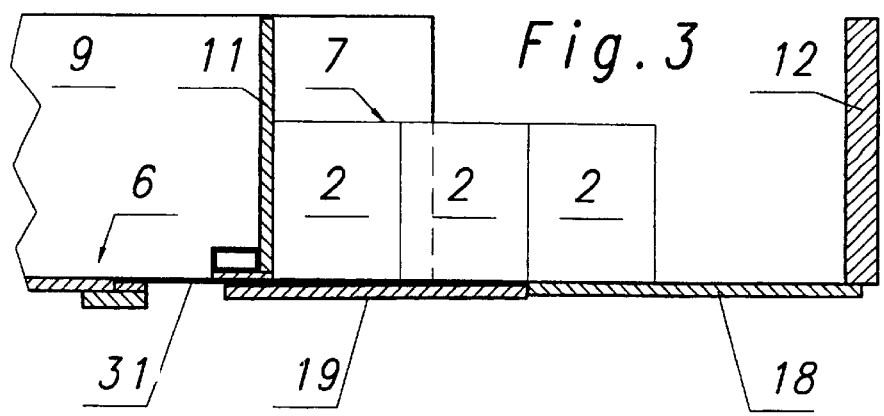

As may be seen from FIG. 2, the take-off device 17 consists of a front take-off plate 18 and a follower plate 19 hinged to the latter. This plate arrangement bridges the gap between the front end 16 of the receiving table 6 and the transverse stop 12 in each operating position. The mentioned plate arrangement can be moved back and forth within a constant travel range in the forward feed direction, as indicated in FIGS. 3 to 5.

To this end, a driving device 20 engages the take-off plate 18, initiating a constant travel range. In the embodiment shown, the driving device 20, as depicted in FIG. 2, is designed as a crank mechanism, whose crankshaft journal 21 engages a web 22 secured to the bottom side of the take-off plate 18.

The take-off plate 18 and follower plate 19 are, as also shown in FIG. 2, attached to each other by means of at least one, preferably several, rods 23 hinged to both plates, distributed over the plate width and bridging the open butt joints of the plate arrangement. The hinges are designed as ball-and-socket joints. To this end, the ends of the rod 23 are provided with spherical caps 24 that engage the spherical heads 25 secured to the bottom side of the take-off plate 18 or follower plate 19. The rod 23 consists of a middle section designed as a threaded sleeve, into which the threaded pins carrying the spherical caps 24 can be screwed, so that the length can be precisely adjusted. As a result, the two plates can be placed exactly against one another. The mutual hinging enables mutual shifts of the plates vertically to the plate surface plane, which will be explained in greater detail below.

The take-off plate 18 and follower plate 19 are held on respectively allocated guides 26 and 28. The guide 26 allocated to the take-off plate 18 runs parallel to the loading surface of the receiving table 6, and is arranged in such a way that the upper side of the take-off plate 18 is always coplanar with the table surface plane. To form the table-parallel guides 26 of the take-off plate 18, simple rails can be provided on which travel running elements 27 attached in the area of the bottom side of the take-off plate 18, here on web 22, which are in this case designed as U-shaped riders that can be placed on the allocated rails. The guides 26 can be secured to the substructure of the transverse stop 12 connected with the table 6.

The guides 28 allocated to the follower plate 19 are designed as a crank guide. To this end, guide rails each equipped with a guiding groove 29 are provided. The back end of these guides can be secured to the framework of the receiving table 7. Running elements 30 designed as rollers and secured to the bottom side of the follower plate 19 run in the guiding grooves 29.

The receiving table 6 is provided with a table projection 31 formed by a thin spring steel sheet that protrudes in the direction of the transverse stop 12. The front area of this projection lies on the follower plate 19. at the front table edge 16 formed by the front edge of the table projection 31, the take-off plate 18 is set to the back end position forming the basis of FIGS. 2 and 3, wherein the coplanar arrangement of the receiving table 6 and take-off plate 18 yields a flush transition. The follower plate 19 is completely pushed under the table projection 31 in the back end position. To this end, the follower plate 19 can be folded down relative to the take-off plate 18.

During the forward feed motion of the plate arrangement consisting of the take-off plate 18 and follower plate 19, the front edge of the follower plate 19 is lifted to the level of the take-off plate 18, as shown in FIGS. 4 and 5, which yields a flush transition between the take-off plate 18 and follower plate 19. To this end, the guiding grooves 29 of the crank guide allocated to the follower plate 19 exhibit two sections 29a, b adjoining each other (see FIG. 6), which are connected to each other by a curved area 32 that bridges a difference in height corresponding to the thickness of the sheet forming the table projection 31. The front section 29a runs parallel to the loading surface of the receiving table 6, and is arranged in such a way that the running elements 30 that engage it lift the follower plate 19 to a level coplanar to the loading surface of the receiving table 6 during the forward feed motion.

The back section 29b is inclined toward the back, so that the follower plate 19 that can be slid under the table projection 31 does not come into surface contact with the table projection, as illustrated in FIGS. 2 and 3. As soon as the front running elements 30 of the follower plate 19 have traversed over the ascending area 32, the front area of the follower plate 19 is lifted or lowered due to the freedom of motion vertical to the plate surface plane enabled by attaching the follower plate 19 to the take-off plate 18. As soon as the back running elements 30 of the follower plate 19 have traversed over the ascending area 32, the back area of the follower plate 19 is also lifted or lowered accordingly. In the front end position, the take-off plate 18 and follower plate 19, as shown in FIG. 5, are coplanar to each other, and hence also coplanar to the top side of the loading table 7. The rising follower plate 19 upwardly deflects the table projection 31 by its thickness, which the thin spring sheet steel forming the table projection 31 enables without any problem.

As illustrated in FIG. 2, the front running elements 30 of the follower plate 19 are arranged in such a way as to be positioned precisely at the lower end of the curve are 32 in the back end position of the plate arrangement. As a result, the front area of the follower plate 19 is already lifted at the beginning of the forward feed motion, and vice versa.

The travel range of the driving device 20 is smaller than the width of the follower plate 19 viewed in the transport direction, so that the table projection 31 still lies reliably on the back area of the follower plate 19, even in the front end position of the plate arrangement (see FIG. 5). On the other hand, the travel range of the driving device 20 is greater than the difference between the distance of the front table edge 16 from the transverse stop 12 and the row width corresponding to the smallest format shown in FIG. 5 at 2a in the transport direction. As a result, even rows with the smallest format width can be reliably placed against the transverse stop 12 undergrasped by the take-off plate 18.

To separate the front row 2 of the layer 7 from the latter and place it against the transverse stop 12, the plate arrangement forming the take-off device 17 is moved to the back end position constituting the basis of FIGS. 2 and 3. In this position, the take-off plate 18 adjoins flush against the table projection. The follower plate 19 is recessed under the table projection. The front end of the take-off plate here extends to just under the transverse stop 12. The width of the take-off plate 18 viewed in the transport direction is hence larger than the gap between the front table edge 16 and the transverse stop 12.

As soon as the mentioned plate arrangement is in the back end position, the layer 7 accommodated on the receiving table 6 can be pushed forward by the layer feed rack carrier 11 to the point where the foremost row 2, as depicted in FIG. 3, comes to lie entirely, or at least primarily, on the take-off plate adjoining flush against the table projection 31. This situation is illustrated in FIG. 3. Due to the flush fit between the take-off plate 18 and table projection 31, the foremost row 2 can be pushed onto the take-off plate 18 without any problem.

The take-off plate 18 and attached follower plate 19 then begin to move forward. In this case, the foremost row 2 taken along by the take-off plate 18 is reliably separate from the layer 7, as shown in FIG. 4. At the same time, the follower plate 19 under the table projection 31 emerges, wherein the front edge of the follower plate 19 fits flush against the take-off plate 18 due to the rise produced by the ascending area 32, as illustrated in FIG. 4.

During the continued forward motion of the plate arrangement, the row 2 accommodated on the take-off plate 18 comes to lie against the transverse stop 12. Independently of the above, the plate arrangement goes through its entire travel range, so that a reliable placement against the transverse stop 12 is achieved even when processing the smallest format 2a. The follower plate 19 here partially runs under the row 2 lying against the transverse stop, which can be done without any problem due to the flush fit between the take-off plate 18 and follower plate 19. The row 2 lying against the transverse stop 12 can then be laterally ejected by means of the row feed rack carrier 13.

The row feed rack carrier 13 can be moved laterally to a point where the last package 3a is pushed into the rocker 14, as evident from FIG. 1. The row feed rack carrier 13 is then returned to the initial position shown in FIG. 1. In this case, a field 34 preceding the rocker 14 and still lying outside the rocker-side edge of the layer 7 is cleared. This field 34 can be scanned by means of a scanner, preferably non-contact. As soon as the field 34 is free, another application procedure can be initiated. To this end, the take-off device 17 is returned from the front end position shown in FIG. 5 to the backend position shown in FIGS. 2 and 3, wherein the above motions take place in reverse sequence, i.e., wherein the follower plate 19 is lowered under the table projection 31 from the level coplanar with the receiving table 6.

The stage between the take-off plate 18 and follower plate 19 that arises in the back end position can be offset by the shims 33 allocated to the take-off plate-side spherical heads 25. In this way, the rod 23 runs plate-parallel in the back end position. During the forward motion, the rod 23 is tipped up on the follower plate side, which counters the development of a gap between the take-off plate 18 and follower plate 19.

What is claimed is:

1. Device for handling face cutting products, in particular a buffer, arranged between a face cutting device and a further processing device, with a table that receives layers comprised of sequential rows, a forward feed device that incrementally advances the layer, a take-off device that takes the respective foremost row of the layer from the forward feed device and places it against a transverse stop running transverse to the take-off device, and an evacuating device allocated to the transverse stop for removing the row placed against the transverse stop, whereby a gap is provided between the table and transverse stop, which accommodates the take-off device, which exhibits a plate arrangement moveable in and against the take-off direction, comprised of a front take-off plate proceeding coplanar to the table and a follower plate hinged to the latter so that it can freely move vertically to the surface plane of the table, wherein the take-off plate travels under the transverse stop, and snugly abuts a table projection in the back end position, and wherein the follower plate on which the table projection lies and which is routed under the table projection in its back end position, can be lifted at least with its front edge from its level lying below table level to a level flush with the take-off plate and vice versa during the forward feed motion.

2. Device according to claim 1, whereby the take-off plate and follower plate are equipped with running elements on the lower side, which engage allocated guides, wherein the guides allocated to the follower plate are designed as a crank guide provided with a curved area.

3. Device according to claim 2, whereby the crank guide allocated to the follower plate exhibits a front, table-parallel section and a back section adjoining it via a curved area that is inclined toward the back.

4. Device according to claim 2, whereby the curved area bridges a difference in height corresponding to the thickness of the table projection, and that the front running elements of the follower plate extend at least to the lower end of the curved area in the back end position.

5. Device according to claim 2, whereby the running elements of the follower plate designed as rollers engage a guiding groove forming the crank guide with the sections adjoining each other via the curved area.

6. Device according to claim 2, whereby the running elements of the take-off plate are designed as U-shaped riders enveloping the respectively allocated, table-parallel guide, preferably designed as a rail.

7. Device according to claim 1, whereby the table projection is designed as a thin spring steel sheet.

8. Device according to claim 1, whereby the travel range of the plate arrangement comprised of the take-off plate and follower plate is constant.

9. Device according to claim 8, whereby the travel range of the plate arrangement is smaller than the width of the follower plate viewed in the take-off direction, and larger than the difference between the distance of the transverse stop from the front table edge and the row width allocated to the smallest format.

10. Device according to claim 1, whereby the forward feed device exhibits a layer feed rack carrier allocated to the layer that can be moved up to the back table edge.

11. Device according to claim 1, whereby the take-off plate is connected with a driving device designed as a crankshaft.

12. Device according to claim 1, whereby the take-off plate and the follower plate are attached to each other by at least one rod bridging the open but joint, wherein the rod ends are hinged to both plates.

13. Device according to claim 12, whereby the ends of the rod are provided with spherical caps that engage the spherical heads attached to the bottom side of the take-off plate or follower plate.

14. Device according to claim 12, whereby the length of the rod is adjustable.

15. Device according to claim 13, whereby each take-off plate-side spherical arrangement is positioned by means of a spacing element whose thickness corresponds to that of the table projection in such a way that the rod is parallel to the table in the back end position.

* * * * *